United States Patent [19]

Hyatt

[11] Patent Number: 4,657,745
[45] Date of Patent: Apr. 14, 1987

[54] VALUE RECOVERY FROM SPENT ALUMINA-BASE CATALYST

[75] Inventor: David E. Hyatt, Northglenn, Colo.

[73] Assignee: Chemical & Metal Industries, Inc., Denver, Colo.

[21] Appl. No.: 846,125

[22] Filed: Mar. 31, 1986

[51] Int. Cl.⁴ .................. C01G 39/00; C01G 51/00; C01G 53/00; C01F 7/00

[52] U.S. Cl. ........................... 423/53; 423/57; 423/128; 423/132; 423/146; 423/150; 75/101 R; 75/108; 75/119; 75/121; 502/27; 502/31; 502/516; 502/517

[58] Field of Search ............... 423/132, 128, 150, 53, 423/146, 57; 75/108, 101 R, 121, 119; 502/27, 31, 516, 517

[56] References Cited

U.S. PATENT DOCUMENTS

| | | | |
|---|---|---|---|
| 2,112,292 | 3/1938 | Jones | 423/57 |
| 3,222,933 | 12/1965 | Erickson | 502/516 |
| 3,656,888 | 4/1972 | Barry et al. | 423/57 |
| 4,087,510 | 5/1978 | Steenken | 423/53 |
| 4,432,953 | 2/1984 | Hubred et al. | 423/53 |
| 4,537,751 | 8/1985 | Marcantonio | 423/132 |

FOREIGN PATENT DOCUMENTS 0038218  3/1979  Japan ..................... 423/57

Primary Examiner—John Doll
Assistant Examiner—Robert L. Stoll
Attorney, Agent, or Firm—Burns, Doane, Swecker & Mathis

[57] ABSTRACT

A process for the recovery of aluminum and at least one other metal selected from the group consisting of molybdenum, nickel and cobalt from a spent hydrogenation catalyst comprising (1) adding about 1 to 3 parts $H_2SO_4$ to each part of spent catalyst in a reaction zone of about 20° to 200° C. under sulfide gas pressure between about 1 and about 35 atmospheres, (2) separating the resultant $Al_2(SO_4)_3$ solution from the sulfide precipitate in the mixture, (3) oxidizing the remaining sulfide precipitate as an aqueous slurry at about 20° to 200° C. in an oxygen-containing atmosphere at a pressure between about 1 and about 35 atmospheres, (4) separating the slurry to obtain solid molybdic acid and a sulfate liquor containing said at least one metal, and (5) recovering said at least one metal from the sulfate liquor in marketable form.

12 Claims, 2 Drawing Figures

II. SULFIDE CONCENTRATE OXIDATION STEPS

VALUE RECOVERY FROM SPENT ALUMINA-BASE CATALYST

This invention was made with Government support under Contract No. DE-AC03-83ET80032 awarded by the Department of Energy. The Government has certain rights in this invention.

TECHNICAL FIELD

This subject invention relates to the recovery of various chemicals and metals from spent alumina-base catalysts. More particularly, the invention relates to acid leaching spent hydrotreating catalysts to recover chemical and metal values. Advantageously, the alumina support is recovered in addition to the catalyst metals themselves.

BACKGROUND OF THE INVENTION

The hydrotreating of petroleum feedstock serves to upgrade the hydrocarbon fraction in the eventual distillate. The purpose of this is to remove impurities such as sulfur, nitrogen, oxygen and organo-metallic compounds which may be present. By hydrotreating prior to cracking or reforming, the quality of the feedstock is improved and downstream cracking or reforming catalysts are protected. That is, the downstream cracking or reforming catalysts are not altered or poisoned, and thus, they may be easily recycled. The most common material which poisons petroleum conversion catalysts is sulfur. Hydrodesulfurization is also beneficial for subsequent combustion of the treated hydrocarbon fraction as fuel in domestic heaters, industrial furnaces, etc., in reducing the discharge of sulfurous combustion products into the atmosphere.

Petroleum refining is one of the largest manufacturing industries in the United States, with petroleum products accounting for at least 10% of the Gross National Product. Six basic catalyst-consuming processes are employed in the conversion of petroleum. The four most important are cracking, hydroprocessing/hydrodesulfurization, catalytic reforming and alkylation. Of lesser importance are hydrocarbon polymerization and isomerization, petrochemical processes such as the manufacture of aldehydes by reaction of carbon monoxide with hydrogen, the manufacture of alcohols by reacting aldehydes with hydrogen, as well as other vapor-phase catalytic processes. Hydrodesulfurization (HDS) is a term that is applied to the hydroprocessing of any petroleum feedstock since desulfurization via catalytic hydrogenation or hydrotreating is involved. However, the term is most appropriate for the treatment of the heavy, semi-solid residue or bottom stream from crude oil distillation towers.

Among the catalysts employed in hydrotreating and hydrodesulfurization are cobalt-molybdenum, nickel-molybdenum and nickel-tungsten combinations on an alumina support. The most common catalyst is a cobalt-molybdenum trioxide.

At the present time, it has been estimated that approximately 55 million pounds of hydrotreating/hydrodesulfurization catalysts are in use in the United States. The annual replacement rate of these catalysts has been reported to be approximately 20-21 million pounds of which approximately 10-11 million pounds are cobalt-molybdenum, approximately 9 million pounds nickel-molybdenum and approximately one million pounds nickel-tungsten.

When cobalt and molybdenum were in short supply and commanded a high price, the metals were frequently recovered from the spent catalysts. Even during periods of good metal markets, the efficiency of the recovery of cobalt and nickel was low and most of the active companies concentrated their efforts on molybdenum recovery. However, since the downturn in the economy and the oversupply of metals in 1980-82, economic factors as well as substantial technical difficulties involved have greatly reduced the incentive for the recovery of metals from the spent catalysts. Surprisingly, little effort has been made in the prior art in seeking to recover the inert alumina support which accounts for about sixty percent of the weight of spent catalysts.

One method by which the active metals in the catalyst have been recovered in the prior art has been by total digestion, i.e., by dissolving the catalyst in hot concentrated sulfuric acid. Although this method has the obvious advantage of being able to recover 100% of the available metals, it also has disadvantages. The amount of acid necessary for total digestion is very costly from an economic standpoint, and the resulting solution contains far more dissolved aluminum than active metals, making separation of the valuable active metals from the relatively inexpensive aluminum a difficult problem.

The current and growing quantity of spent catalysts is also of environmental concern. Not only do the spent materials tend to be pyrophoric but they also contain leachable toxic heavy metals such as arsenic in addition to the nickel, cobalt or molybdenum. Moreover, present commercial processes tend to recover only molybdenum or cobalt and leave the inert alumina matrix and unrecovered metals for land disposal. The prior art is lacking in an economical method to recover and reuse all significant chemical and metal values including the alumina matrix.

The present invention overcomes the problems and disadvantages present in the prior art by providing a simple, efficient and economical method for effecting a substantially complete extraction and recovery of valuable metal values from spent hydrodesulfurization or hydrogenation catalysts.

OBJECTS OF THE INVENTION

Thus, it is a general object of the present invention to provide a novel process to recover cobalt, nickel, molybdenum and other strategic metals from spent hydrogenation catalysts.

It is another object of the invention to provide a novel process for recovering alumina from spent hydrogenation catalysts.

It is a more specific object of the invention to provide a novel process to recover the catalytic metals from spent hydrodesulfurization catalysts in marketable form.

It is a further object of the invention to provide a novel process for recovering the metal values from spent catalysts in an energy efficient manner.

Still another object of the invention is to provide a novel process for solving the hazardous waste disposal problem associated with spent metal-containing catalysts.

These and other objects will be more apparent when taken in conjunction with the following disclosure, accompanying drawing and the appended claims.

SUMMARY OF THE INVENTION

According to the present invention, a novel process has been developed which will convert spent petroleum conversion or hydrogenation catalysts into marketable forms of aluminum, molybdenum, and other strategic metals in an energy-conserving manner, while solving the hazardous waste disposal problems associated with spent solid catalysts. All significant chemical and metal values may be recovered and reused from spent catalysts including the alumina catalyst matrix. Unrecovered trace metals such as arsenic are fixed so that they will not leach into the groundwater if landfilled.

DESCRIPTION OF THE PREFERRED EMBODIMENTS

Figure 1:
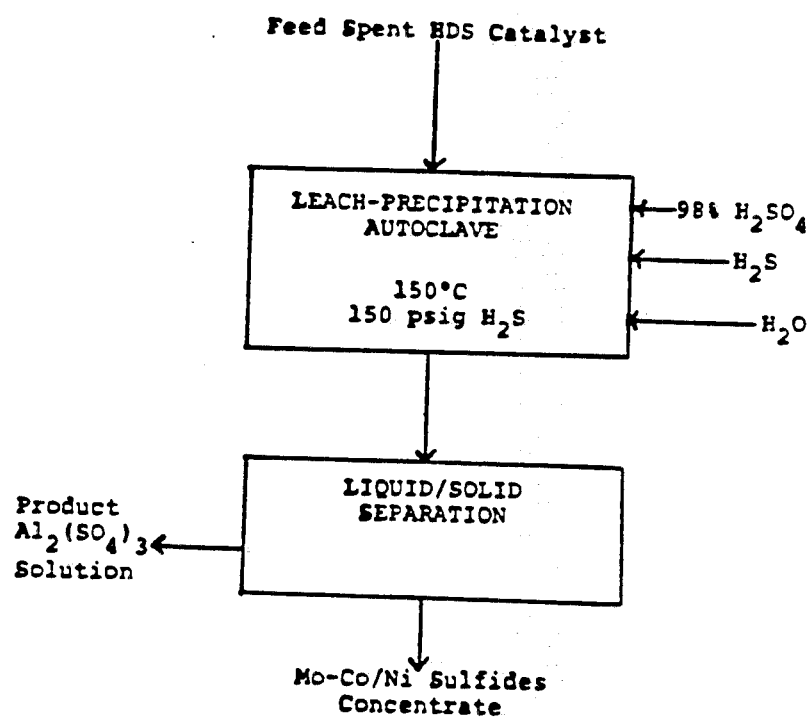
FIG. 1 comprises a schematic flow diagram illustrating the process steps for effecting the primary separation of spent hydrodesulfurization (HDS) catalyst in accordance with one exemplary embodiment of the present invention.

The hydrodesulfurization catalysts are originally in the form of small rods or pellets; the largest dimensions are generally less than one centimeter. They are comprised generally of an activated inorganic oxide support which is porous. The inorganic oxide support commonly comprises activated alumina, or alumina composited with one or more inorganic oxides such as silica, zirconia, thoria, magnesia, titania, zinc oxide and the like. The inorganic oxide support is impregnated with compounds containing certain catalytically active metals such as cobalt, molybdenum and nickel. While in use these catalysts become spent or poisoned due to loss of surface area, sintering and/or to the fixation thereon of vanadium compounds, carbon resulting from the partial decomposition of hydrocarbons, and sulfur. A certain number of other metallic or nonmetallic impurities may also become deposited.

The spent petroleum conversion catalysts are generally discharged directly from the refinery operation as a solid, often in the form of an extrudate about 0.16 cm by 0.65 cm. This extrudate contains spent hydrodesulfurization (HDS) catalyst as well as a variety of other impurities from the refinery process. Optionally, the waste catalysts may be directly removed from the refinery units without subjecting them to any treatment prior to subjecting them to the process of the present invention.

Generally, no oil is present in the extrudate as obtained from the refinery. However, if oil is present a deoiling step is necessary prior to treatment. This can be achieved for example by washing with a low-boiling solvent, for instance an organic solvent such as petroleum naphtha, as is conventional in the art, for elimination of the major part of the hydrocarbons contained in the pores of the catalyst. Residual solvent is then eliminated by distillation at a suitable temperature. The hydrocarbons can also be burned, in a strictly limited quantity of air so as to stop the combustion before the noncombined carbon is also oxidized. This can be achieved by heating a mass of catalyst to a temperature on the order of 400° C. for approximately one-half hour in a furnace in the presence of air but without forced circulation of the air, whereby the hydrocarbons are practically completely burned, but the major part of the elemental carbon or coke remains unoxidized.

Alternatively, a bed of spent hydrocarbon containing catalyst can be heated from the outside while contained in a closed treatment vessel at a temperature on the order of 400° C., having nitrogen flowing through it. The nitrogen effluent becomes charged with volatile liquid materials which distill slowly, a little at a time, and it is thus possible to recover them by condensation. The catalyst particles are now ready for treatment by the process of the present invention.

It has been found, for instance that, according to the process of the present invention, efficient and economical recovery of metal values from spent alumina-base hydrogenation catalysts comprising molybdenum as well as cobalt or nickel or both may be accomplished by (1) adding $H_2SO_4$ to the spent solid catalyst at about 20° to 200° C. in a hydrogen sulfide atmosphere maintained at a pressure of between about 1 and about 35 atmospheres (gauge pressure), (2) separating the $Al_2(SO_4)_3$ solution from the mixture to obtain a marketable aluminum sulfate solution, (3) oxidizing the remaining sulfide precipitate slurry at about 20° to 200° C. and at a pressure of about 0 to about 35 atmospheres of oxygen (gauge pressure), (4) separating the slurry to obtain solid molybdic acid and cobalt-nickel from the sulfate solution in marketable form and (6) recycling the $H_2SO_4$-molybdenum liquors to step (1). Thus, a pressure, leach-precipitation process has been developed for recovering the chemical and metal values from spent hydrogenation catalyst.

Figure 2:
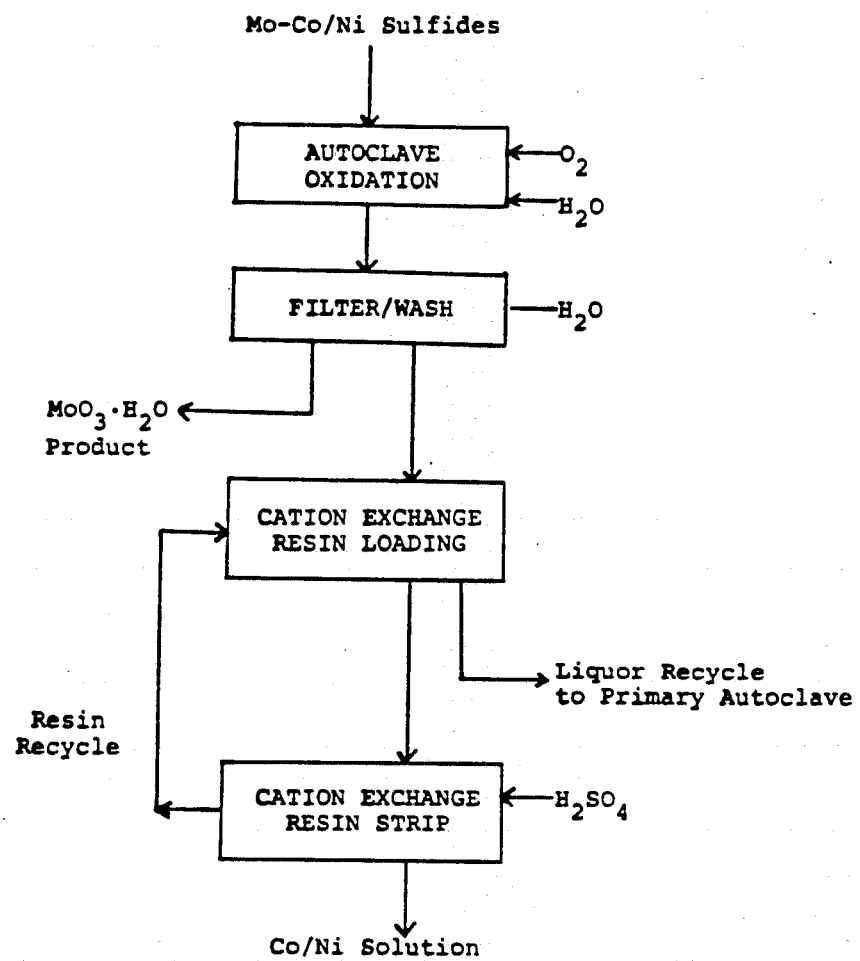
FIG. 2 is a schematic flow diagram illustrating the process steps of effecting the sulfide concentrate oxidation in accordance with a second embodiment of the present invention.

This process is diagrammed in FIG. 1 and FIG. 2. FIG. 1 presents a processing flowsheet for the primary separation of a spent hydrodesulfurization catalyst. FIG. 2 depicts the sulfide concentrate oxidation steps. In this process the catalyst is reacted with aqueous concentrated sulfuric acid in a low-pressure autoclave in the presence of added hydrogen sulfide gas. The reaction produces a metal sulfide precipitate and an aluminum sulfate solution. Separation of these two phases may be accomplished by any method known in the art, including decanting, centrifuging, and filtration. Filtration is preferred over the other methods of separation for reasons of cost and efficiency. The separation yields aluminum sulfate (alum) solution and a metal concentrate from which molybdenum, cobalt, and nickel are separated and recovered by oxidative leaching and ion exchange. The resulting chemical heat of reaction can supply a major portion of the required process energy.

The initial step of the process is the complete disintegration of the catalyst's alumina matrix via the strongly exothermic and, hence, energy efficient reaction:

$$Al_2O_3 + 3H_2SO_4 \rightarrow Al_2(SO_4)_3 + 3H_2O + \text{heat}$$

At one stroke, this reaction converts all the alumina to a commercially useful form, aluminum sulfate or alum, while making the other components, molybdenum, cobalt, and nickel, accessible to recovery.

Furthermore, the hazardous waste disposal problem has been solved since the hazardous ingredients of the original catalyst are either destroyed or recycled. The only solid waste is generally an innocuous silicious material amounting to approximately ten weight percent of the original spent catalyst.

I. Primary Separation of Spent HDS Catalyst

FIG. 1 depicts the primary separation of spent hydrodesulfurization (HDS) catalyst using pressure hydrometallurgy. Pressure hydrometallurgy offers numerous advantages in processing varied mineral resources for value recovery. Elevated temperature and pressure conditions allow more rapid reaction than at atmospheric pressure and in some cases better handling of reaction by-products. Thus, leaching and precipitation and the like will occur at a more rapid rate. The spent hydrodesulfurization catalyst, typically containing high levels of cobalt, nickel, molybdenum and aluminum, is a particularly suitable feed for a pressure hydrometallurgical process. A typical composition may include about 20 to 38% aluminum, about 5 to 15% molybdenum, about 1 to 5% nickel and about 1 to 5% cobalt. In particular, elevated temperatures (especially 150°–200° C.) favor dehydration of silica gels if any are present, thus improving filtration rates. It is also likely that more rapid reaction kinetics at elevated temperature allows nearly stoichiometric acid consumption during $Al_2O_3$ dissolution (about 2,000 kg 98% $H_2SO_4$ per metric ton of spent catalyst containing about 67% $Al_2O_3$). The speed of the reaction involving gaseous reactants are also increased by elevated pressure.

Applicants discovered that complete dissolution of cobalt, nickel and molybdenum components of spent hydrodesulfurization catalysts was not effected by $H_2SO_4$ alone, even at elevated temperature. However, adding sulfiding agents such as elemental sulfur or $H_2S$ to the autoclave leach quantitatively suppressed cobalt, nickel and molybdenum solubility. Thus, autoclave leaching improved filtration characteristics and achieved the separation of aluminum from transition metals.

$H_2S$ or elemental sulfur may be used as the sulfide source. However, $H_2S$ gas is preferred over sulfur because of its ease of handling and because lower temperatures can be used.

Step (1) is capable of quantitatively converting the $Al_2O_3$ matrix of the catalyst to a solution of $Al_2(SO_4)_3$ which is saleable as such while precipitating the cobalt, nickel and/or molybdenum into a solid sulfide mass. The amount of $H_2SO_4$ useful in the practice of the present invention is dependent on the composition of catalyst extrudate being treated, as this determines the acid consumption character of the extrudate. The amount of $H_2SO_4$ used is generally within the range of about 1 to 3 kg of $H_2SO_4$ per kg of catalyst. That is, about 1000 to 3000 kg of $H_2SO_4$ per metric ton of catalyst. Preferably, about 1500 to 2500 kg of $H_2SO_4$ per ton are used. More preferably, about 2000 kg of $H_2SO_4$ are used per ton of typical spent hydrodesulfurization catalyst.

A suitable amount of water is also added at this stage to aid in dissolving $Al_2O_3$ and to assist in later separation steps. Advantageously, the water to catalyst ratio is determined so that the final $Al_2(SO_4)_3$ solution is near commercial strength (about 4 to 5% aluminum). The amount of water is usually in the range of about 1 to 20 milliliters per gram of spent hydrodesulfurization catalyst. Preferably, about 5 to 9.5 milliliters per gram of catalyst.

The spent metal-laden catalyst is treated in contact with the sulfuric acid and sulfiding agent in aqueous solution at conditions to effect maximum contact with the extracting solution. One preferred method is a continuous type of operation whereby the spent catalyst is continuously charged to a recovery vessel and processed downwardly therethrough in contact with the treating solution percolated upwardly through the spent catalyst mass and subsequently withdrawn overhead. As an alternative method, the spent catalyst can be immersed in the treating solution for a predetermined time, preferably with agitation, i.e. under conditions in which the treating solution is circulated through or over the spent catalyst.

The temperature is in the range of about 20° to 200° C., preferably, about 100° to 200° C. The absolute pressure is in the range of about 1 to about 35 atmospheres, preferably in the range of about 7.5 to 15.0 atmospheres. A hydrogen sulfide atmosphere is used since it assists in the precipitation of the cobalt, molybdenum and nickel and thereby improves the efficiency of the process.

In step (2), the mixture is separated and the solid is removed. Any method of mechanical separation known in the art is suitable, but filtration is usually preferred. The filtrate is an $Al_2(SO_4)_3$ solution which is in ready-to-sell form. No further treatment is necessary. The filtered solid material is a sulfide concentrate and is essentially a wet fine powder filter cake of molybdenum, cobalt and/or nickel sulfide. Occasionally, silicon dioxide ($SiO_2$) is present in the filter cake since some catalysts use silica as a binder or as a component of the catalyst support. A small amount of carbon or coke, which may have been present on the catalyst and was insoluble in sulfuric acid or the aluminum sulfate solution formed, may also be present.

The described pressure leach of spent alumina-base hydrogenation catalysts with sulfuric acid and in the presence of hydrogen sulfide quantitatively converts $Al_2O_3$ to $Al_2(SO_4)_3$ solution, with $H_2SO_4$ consumption of approximately 2,000 kg per ton of catalyst, while simultaneously converting molybdenum, cobalt and nickel to insoluble sulfide forms. This latter conversion is almost quantitative if $H_2S$ pressure in the reaction zone is kept in the higher end of the disclosed range, i.e. between about 10 and 14 atmospheres.

II. Sulfide Concentrate Oxidation

The mixed metal sulfides from the primary separation of spent hydrodesulfurization catalyst described above may remain as a concentrate and be sold in that form. However, to facilitate marketing, the mixed metal sulfide concentrate is preferably separated into a molybdenum concentrate and a concentrate containing nickel/cobalt and other metals present. Thus, the second major phase of the present process involves a pressurized oxidation of the mixed sulfide concentrate followed by filtration (isolating solid molybdic acid), isolation of cobalt and nickel for subsequent recovery (for example by ion exchange) and recycle of the acidic ($H_2SO_4$) molybdenum-containing liquor to the leach-precipitation autoclave. Impurities such as arsenic can build up in the recycle, however, by controlling acidity in the oxidation liquor or by a controlled addition of $H_2S$ to the recycle $H_2SO_4$ stream, arsenic can be precipitated in the form of $As_2S_3$ and recovered for use or disposal.

Accordingly, in step (3) the sulfide precipitate is oxidized. Thus, the cobalt and nickel sulfides are converted to sulfates. The molybdenum sulfide is converted to $MoO_3.H_2O$. The temperature is generally in the range of about 20° to 200° C., preferably about 100° to 200° C. The pressure is typically in the range of from about 1 atmosphere to 35 atmospheres of oxygen, preferably, about 7 to 20 atmospheres. Oxygen gas ($O_2$) pressure is preferably used since it is more efficient than air in this reaction. When air is used it should be used at a pressure about five times greater than the pressure just indicated, i.e., it should be used at a pressure providing an oxygen partial pressure of between about 0 and 35 atmospheres.

In step (4), the slurry from step (3) is separated to yield molybdic acid ($MoO_3.H_2O$) as a wet filter cake and a cobalt-nickel sulfate solution. Again, any method of mechanical separation is useful but filtration is preferred. Not all of the molybdic acid is filtered off in step (4), a small amount remains soluble in the filtrate.

In step (5), the cobalt and nickel are recovered from the sulfate solution in marketable form. This may be accomplished by any method wellknown in the art. Two possible methods are electrowinning and solvent extraction where the cobalt and nickel are taken out of the solution and the remaining molybdenum and $H_2SO_4$ remain in solution. Another common method for separating dissolved metals such as cobalt and nickel from the molybenum and $H_2SO_4$ which remain in solution is ion exchange. In ion exchange, the cobalt and nickel are taken out of solution and loaded onto an ion exchange resin. An acid is usually put back into the solution. Useful ion exchange resins include: solid, strong acid resins, e.g., Amberlite 120, Amberlite 200, Amberlite IR-118(H); and solid chelating resins, e.g., Amberlite IRC-178, Chelex 100. Liquid ion exchange/solvent extraction reagents generally known in the art are also useful. Any acid may be used to strip the cobalt and/or nickel from the ion exchange resin. Suitable acids include HCl, $HNO_3$ and $H_2SO_4$. The preferred acid is $H_2SO_4$. The acid used is preferably in the range of about 5% to 40%, particularly preferred is about 10% to 30%.

In step (6), the $H_2SO_4$-molybdenum liquors from step (5) are recycled to step (1). The above-described process operates with very little generation of solid waste or effluent discharge and gives high recovery values.

The pressure oxidation of the mixed cobalt-molybdenum-nickel sulfide concentrate results in selective dissolution of cobalt and nickel content while soluble molybdenum levels are limited by molybdic acid solubility. It has been suggested that molybdic acid solubility in $H_2SO_4$ is pH dependent and falls within the range of about 3 to 20 grams molybdenum per liter of $H_2SO_4$ at pH 1-2. Filtration of the oxidation liquor proceeds rapidly (approximate rate >5.3 l/hr/m$^2$) producing a cobalt (and/or nickel)-rich liquor and a molybdenum-rich residue.

An approximate leach time for full oxidation is about two to ten hours at 200° C. and 15 atmospheres $O_2$.

Preferably, the leach time is approximately four hours at 200° C. and 15 atmospheres $O_2$ for full oxidation.

Unless otherwise indicated, all proportions of materials are stated on a weight basis throughout this specification and the appended claims.

EXAMPLE 1

Primary Separation of Spent HDS Catalyst

Laboratory screening tests were conducted by reacting concentrated $H_2SO_4$ and spent catalyst in a 2000 cc glass-lined titanium autoclave. The tests were conducted both with and without sulfides. The results of these tests are presented in Tables 1, 2 and 3.

The spent hydrodesulfurization catalyst used in each of the tests was obtained from a commercial refinery. The spent catalysts were obtained in the form of extrudates, about 3 mm in diameter by about 6.5 mm in length, and had the following typical composition given in weight percent:

| Al | 33.6 | wt. % |
|---|---|---|
| Mo | 9.42 | |
| Co | 3.23 | |
| Ni | 0.1 | |

The balance of the composition is oxygen, as well as, $SiO_2$, carbon, water and sulfur.

Tables 1, 2 and 3 demonstrate that the reaction of spent hydrodesulfurization catalyst with $H_2SO_4$ proceeded rapidly in the autoclave under autogenous pressure at 100°-200° C. The consumption of $H_2SO_4$ was essentially stoichiometric for the calculated oxide content in the spent catalyst (about 2,000 kg 98% $H_2SO_4$ per metric ton of spent catalyst). The filtration characteristics of the reaction slurry were improved over those of reaction slurries produced at atmospheric pressure. The improvement probably arose from the dehydration of silica gels to amorphous and/or crystalline $SiO_2$ at the higher temperatures in the autoclave (150°-200° C.). Complete dissolution of cobalt, nickel and molybdenum components of spent hydrodesulfurization catalysts was not effected by $H_2SO_4$ alone, even at elevated temperature. However, when sulfiding agents (e.g., elemental sulfur or $H_2S$) were added to the autoclave, cobalt, nickel and molybdenum were separated quantitatively. Thus, autoclave leaching improved filtration characteristics and achieved the separation of aluminum from transition metal components.

TABLE 1

ANALYTICAL DATA-PRESSURE LEACH-$H_2SO_4$ ONLY

| TEST | FILT. RATE L/HR/M$^2$ | lb/Ton 98% $H_2SO_4$ | HDS MESH | g/liter in LIQUOR Al | Mo | Co | % in RESIDUE Al | Mo | Co | % DISSOLUTION Al | Mo | Co | TEMP °C. | TIME Hours |
|---|---|---|---|---|---|---|---|---|---|---|---|---|---|---|
| 1 | 2.04 | 4000 | 35 × 0 | 20.7 | 2.43 | 1.87 | 3.74 | 12.6 | 0.89 | 92 | 29 | 82 | 200 | 1.0 |
| 2 | 1.59 | 4500 | 35 × 0 | 35.3 | 3.27 | 2.71 | 1.79 | 25.5 | 1.54 | 99 | 36 | 89 | 200 | 1.0 |
| 3 | 2.61 | 4500 | 4 × 0 | 38.8 | 4.39 | 4.71 | 6.04 | 31.5 | 1.45 | 96 | 37 | 93 | 200 | 1.0 |

TABLE 2

ANALYTICAL DATA-PRESSURE LEACH-$H_2SO_4$ WITH ELEMENTAL SULFUR

| TEST | FILT. RATE L/HR/M$^2$ | lb/T 98% $H_2SO_4$ | lb/Ton Sulfur | HDS MESH | g/liter in LIQUOR Al | Mo | Co | % in RESIDUE Al | Mo | Co | % DISSOLUTION Al | Mo | Co | TEMP °C. | TIME HOUR |
|---|---|---|---|---|---|---|---|---|---|---|---|---|---|---|---|
| 4 | 4.58 | 4500 | 256 | 35 × 0 | 25.0 | 0.31 | 2.14 | 3.69 | 20.6 | 2.15 | 94 | 3 | 69 | 200 | 1.0 |
| 5 | 2.18 | 4000 | 200 | 16 × 35 | 40.6 | 0.03 | 2.96 | 4.46 | 22.1 | 1.64 | 94 | 1 | 75 | 200 | 1.0 |
| 6 | 2.14 | 3880 | 160 | 16 × 35 | 42.2 | 0.13 | 3.18 | 4.11 | 25.0 | 1.74 | 95 | 1 | 76 | 200 | 1.0 |

TABLE 2-continued

ANALYTICAL DATA-PRESSURE LEACH-$H_2SO_4$ WITH ELEMENTAL SULFUR

| TEST | FILT. RATE L/HR/M$^2$ | lb/T 98% $H_2SO_4$ | lb/Ton Sulfur | HDS MESH | g/liter in LIQUOR | | | % in RESIDUE | | | % DISSOLUTION | | | TEMP °C. | TIME HOUR |
|---|---|---|---|---|---|---|---|---|---|---|---|---|---|---|---|
| | | | | | Al | Mo | Co | Al | Mo | Co | Al | Mo | Co | | |
| 7 | 3.30 | 4000 | 160 | 16 × 35 | 28.4 | 0.04 | 2.62 | 8.17 | 23.7 | 0.12 | 88 | 1 | 98 | 225 | 1.0 |

TABLE 3

TEST CONDITIONS AND ANALYTICAL DATA - $H_2S$ PRECIPITATION

| TEST | °C. TEMP | lb/Ton 98% $H_2SO_4$ | PSIG $H_2S$ | HDS MESH | g/liter in LIQUOR | | | % in RESIDUE | | | % DISSOLUTION | | |
|---|---|---|---|---|---|---|---|---|---|---|---|---|---|
| | | | | | Al | Mo | Co | Al | Mo | Co | Al | Mo | Co |
| 8 | 150 | 4000 | 120 | 4 × 0 | 34.8 | 0.01 | 1.14 | 6.03 | 12.3 | 5.42 | 92 | <1 | 27 |
| 9 | 200 | 4000 | 100 | 4 × 0 | 36.5 | 0.01 | 0.53 | 12.4 | 17.0 | 5.22 | 79 | <1 | 11 |
| 10 | 150 | 4000 | 140 | 35 × 0 | 39.0 | 0.01 | <0.01 | 1.06 | 31.7 | 9.01 | 99 | <1 | <1 |

In each of the tables, "filt. rate" represents the filtration rate in liter/hour/square meter (l/hr/m$^2$). HDS mesh indicates the screen size of the hydrodesulfurization catalyst mesh, for example, 35×0 means using a 35 mesh screen with all of the material passing through. A Tyler screen was used in the examples of the present invention.

The addition of $H_2S$ during the $H_2SO_4$ leach results in optimum precipitation of the metal sulfides (e.g., cobalt, nickel and molybdenum). Elemental sulfur can be used in place of $H_2S$ but it is less effective. Thus, aluminum is dissolved and easily separated from the other metals since the other metals are precipitated.

It has also been determined that a finer grind improves $Al_2O_3$ dissolution and therefore separation of the aluminum from the cobalt, nickel and molybdenum. In addition, higher $H_2S$ pressure also improves the separation.

EXAMPLE 2

Ion Exchange Separation of Cobalt and Nickel From Molybdenum

A cation exchange resin (Amberlite IR 120; acid form; strong acid exchanger) was used to separate soluble cobalt and nickel from molybdenum in the leach liquor. The Co/Ni was then isolated for subsequent recovery while the effluent from the cation exchanger column was recycled to the primary leach precipitation autoclave for recycle of molybdenum and $H_2SO_4$ content.

A column of IR 120 resin (40 ml wet volume) was loaded to cobalt-breakthrough with the oxidation liquor referenced in Table 4. Aliquots of column effluent (25 ml) were collected separately and analyzed for cobalt, molybdenum and aluminum by DC plasma spectrometry (DCP).

The loaded ion exchange column was then stripped with 33% $H_2SO_4$ to elute cobalt (and/or nickel) and regenerate the resin. Aliquots of the strip liquor were collected and analyzed for cobalt, molybdenum and aluminum.

It was determined that a typical strong acid cation exchange resin was capable of selectively exchanging cobalt (and/or nickel) from the pressure oxidation liquor and that 33% $H_2SO_4$ selectively strips cobalt and/or nickel from the ion exchange resin. Cobalt loading on the resin from the test liquor is about 0.8 milliequivalent cobalt per milliliter of wet resin.

EXAMPLE 3

Primary Separation of Spent HDS Catalyst 300 grams 98% $H_2SO_4$ was added to a slurry of 150 g spent HDS catalyst with 800 g $H_2O$ in a 2-liter, glass-lined titanium autoclave. The autoclave was purged with $N_2$ and then pressurized to 150 psig (11 atm) with $H_2S$. The autoclave charge was heated to 150° C. and held at 150° C. for 1 hour to complete the reaction. After cooling to 25° C., the autoclave was vented and the product slurry filtered to yield 1058 grams of $Al_2(SO_4)_3$ liquor and 51 grams (dry) of sulfide concentrate.

TABLE 4

ANALYTICAL DATA-MIXED Co—Ni—Mo SULFIDE PRESSURE OXIDATION

| SAMPLE | WT/VOL | Wt % if solid g/liter if liquid | | | wt (g) | | | % DISTRIBUTION | | |
|---|---|---|---|---|---|---|---|---|---|---|
| | | Al | Mo | Co | Al | Mo | Co | Al | Mo | Co |
| Feed | 50.3 g | 0.82 | 28.6 | 9.94 | — | — | — | — | — | — |
| Liquor | 275 ml | 1.36 | 4.05 | 10.9 | 0.37 | 1.11 | 3.00 | 90 | 8 | 60 |
| Residue | 33.2 g | 0.11 | 40.1 | 6.02 | 0.04 | 13.3 | 2.00 | 10 | 92 | 40 |

EXAMPLE 4

Sulfide Concentrate Oxidation 50 grams of sulfide concentrate (from Example 3) and 200 grams $H_2O$ were added to a 2-liter, glass-lined titanium autoclave. After purging, the autoclave was pressurized to 200 psig (14.6 atm) with $O_2$ and then heated to 200° C. The reaction was continued for 2 hours at 200° C. The product slurry in the autoclave was cooled to 25° C., the autoclave vented, and slurry filtered to yield 33 grams of (crude) $MoO_3.xH_2O$ and 275 milliliters of solution containing Co-Ni values. See Table 4.

While the invention has now been described with reference to several preferred embodiments, those skilled in the art will appreciate that various substitutions, omissions, modifications, and changes may be made without departing from the scope or spirit hereof. Accordingly, it is intended that the foregoing description be considered merely exemplary of the invention and not a limitation thereof.

I claim:

1. A process for the recovery of aluminum, molybdenum and at least one other metal selected from the group consisting of nickel and cobalt from a spent catalyst comprising molybdenum, said at least one metal and carbonaceous matter deposited on a refractory alumina-containing inorganic oxide support, said process comprising:

(1) adding about 1 to 3 parts of $H_2SO_4$ to each part of spent catalyst in a reaction zone at about 20° to 200° C. in the presence of elemental sulfur or under hydrogen sulfide gas pressure between about 1 and about 35 atmospheres and maintaining the resulting mixture in said reaction zone until the alumina is substantially completely dissolved and a metal sulfide precipitate is formed from the molybdenum and said at least one other metal, (2) mechanically separating the resultant $Al_2(SO_4)_3$ solution from the sulfide precipitate in the mixture, (3) oxidizing the remaining sulfide precipitate as an aqueous slurry at about 20° to 200° C. in an oxygen-containing atmosphere at a pressure between about 1 and about 35 atmospheres, (4) mechanically separating the slurry to obtain solid molybdic acid and a sulfate liquor containing soluble molybdenum and said at least one metal, and (5) separating and recovering said at least one metal from the molybdenum-containing sulfate liquor.

2. A process according to claim 1, comprising an additional step (6) wherein the sulfate liquor from step (5) is recycled to step (1).

3. A process according to claim 1, wherein about 1.5 to 2.5 parts $H_2SO_4$ are added per part of spent catalyst in step (1).

4. A process according to claim 1, wherein in step (1) the temperature is within the range of about 100° to 200° C. and hydrogen sulfide is present at the partial pressure of between about 7.5 and about 15 atmospheres.

5. A process according to claim 1, wherein the mechanical separations in steps (2) and (4) comprise filtration.

6. A process according to claim 1, wherein in step (3) the temperature is within the range of about 100° to 200° C. and the molecular oxygen is present at a partial pressure of between about 7.0 and about 20.0 atmospheres.

7. A process for the recovery of aluminum and molybdenum from a spent hydrodesulfurization catalyst comprising molybdenum and at least one catalytically active metal selected from the group consisting of nickel and cobalt and carbonaceous matter deposited on a refractory alumina-containing inorganic oxide support, said process comprising adding about 1 to 3 parts concentrated $H_2SO_4$ per part of hydrodesulfurization catalyst in a reaction zone at about 20° to 200° C. and in the presence of elemental sulfur or hydrogen sulfide gas at a pressure of between 2 and about 35 atmospheres, maintaining the resultant mixture in the reaction zone until the alumina in the catalyst is substantially completely dissolved, and a metal sulfide precipitate is formed from said molybdenum and said at least one other metal, and mechanically separating the resultant $Al_2(SO_4)_3$ solution from the resultant metal oxide-containing solid residue.

8. A process according to claim 7, wherein about 1.5 to 2.5 parts of $H_2SO_4$ are added per part of spent hydrodesulfurization catalyst.

9. A process according to claim 7, wherein the temperature during the $H_2SO_4$ addition is within the range of about 100° to 200° C. and the hydrogen sulfide gas is present at a pressure within the range of from about 7.5 to about 15.0 atmospheres $H_2S$.

10. A process for the recovery of solid molybdic acid from an aqueous slurry comprising sulfides of molybdenum and at least one other metal selected from the group consisting of cobalt and nickel, comprising oxidizing said sulfides at about 20° to 200° C. and in an oxygen atmosphere at a pressure between about 1 and about 35 atmospheres, mechanically separating the slurry to obtain resulting solid molybdic acid and an aqueous metal sulfate solution comprising dissolved molybdenum and said at least one other metal, and separating and recovering said at least one other metal from the sulfate solution containing the dissolved molybdenum.

11. A process according to claim 10, wherein the temperature is within the range of about 100° to 200° C. and the oxygen is at a partial pressure of from about 7.0 to about 20.0 atmospheres.

12. A process according to claim 10, wherein cobalt and nickel in the aqueous metal sulfate solution are separated from molybdenum and $H_2SO_4$ by ion exchange.

* * * * *